United States Patent [19]

Fukuoka et al.

[11] Patent Number: 5,128,836
[45] Date of Patent: Jul. 7, 1992

[54] ALUMINUM FOIL FOR ELECTROLYTIC CAPACITORS

[75] Inventors: Kiyoshi Fukuoka, Nagoya; Masaharu Kurahashi, Toyoake; Nobuo Osawa, Nagoya, all of Japan

[73] Assignee: Sumitomo Light Metal Industries, Ltd., Tokyo, Japan

[21] Appl. No.: 746,700

[22] Filed: Aug. 16, 1991

[51] Int. Cl.$^5$ .................... H01G 9/05; C22C 21/00
[52] U.S. Cl. .................................. 361/529; 420/528
[58] Field of Search ............... 361/303, 304, 305, 529, 361/530; 75/138

[56] References Cited

U.S. PATENT DOCUMENTS 3,997,339  12/1976  Fickelscher ........................ 420/528

Primary Examiner—Donald A. Griffin
Attorney, Agent, or Firm—Flynn, Thiel, Boutell & Tanis

[57] ABSTRACT

An aluminum foil for electrolytic capacitors in which the sub-surface layer having a depth range from 0.1 to 0.2 $\mu$m below the surface contains at least one element selected from the group consisting of Pb, Bi, and In at a total average concentration ranging from 0.001 to 0.1 wt %, and in which the inner part below the sub-surface layer contains less than 0.0001 wt % average concentration for each of Pb, Bi, and In, and in which the average aluminum purity throughout all layers from the surface to the inner part is not less than 99.90 wt %. This aluminum foil has adequate development of tunnel type etch pits and possesses superior electric characteristics and strength.

3 Claims, No Drawings

ALUMINUM FOIL FOR ELECTROLYTIC CAPACITORS

FIELD OF THE INVENTION

This invention relates to an aluminum foil for electrolytic capacitors, and specifically relates to an aluminum foil for electrolytic capacitors with developed tunnel type etch pits and a superior electric characteristics and strength.

BACKGROUND ART

It is well known that addition of slight amounts of Pb, Bi, or In can improve the electric characteristics of aluminum foil for electrolytic capacitors (See for example, Japanese patent publication No. 44-29577, Japanese patent Kokai No. 53-114059, and Japanese patent Kokai No. 57-110646).

Components such as Pb, Bi, and In enhance the pit generation of a capacitor foil, which then increases the capacitance of a capacitor foil. On the other hand, etching tends to create excessive pits on aluminum foil which reduces the strength of the foil. To resolve the problem, an aluminum foil was proposed by Japanese patent publication No. 62-42370, which contains Pb, Bi, and In in the surface layer but does not actually contain Pb, Bi, and In within the inner part of the foil.

The aluminum foil for capacitors described in Japanese patent publication No. 62-42370 consists of a surface layer having a depth of 0.1 $\mu$m below the surface and containing at least one element selected from the group consisting of Pb, Bi, and In at a total concentration ranging from 0.005 to 0.2 wt %, while the inner part other than the surface layer contains no Pb, Bi, and In, or less than 0.0001 wt % for each element, and more preferably less than 0.00001 wt %. This layer composition induces the formation of a number of pits during the initial stage of etching, and let these pits continue to develop into the inner part consisting of high purity aluminum, and enhances the expansion of the surface area.

The presence of Pb, Bi, and In only in the surface layer enhances pit formation during the initial stage of etching. However, this compositional structure has the disadvantage that further progress of etching is inhibited preventing the development of pits beyond the thickness of the surface layer, thus making it difficult to obtain an enlarged surface area.

SUMMARY OF THE INVENTION

The object of this invention is to provide an aluminum foil for electrolytic capacitors which resolves the above described problem and allows development of etch pits into the inner part of foil in a tunnel pattern.

The aluminum foil for electrolytic capacitors achieving the above described object consists of a sub-surface layer having a depth range from 0.1 to 0.2 $\mu$m below the surface and containing at least one element selected from the group consisting of Pb (lead), Bi (bismuth), and In (Indium) at a total average concentration ranging from 0.001 to 0.1 wt %, and consists of an inner part, below the sub-surface layer, containing less than 0.0001 wt % average concentration for each of Pb (lead), Bi (bismuth), or In (Indium), and the average aluminum purity throughout all layers from the surface to the inner part is not less than 99.96 wt %.

When the sub-surface layer of aluminum foil, which has a depth of 0.1 to 0.2 $\mu$m below the surface, contains at least one element selected from the group consisting of Pb, Bi, and In at a total average concentration of less than 0.001 wt %, the amount of pit formation induced by etching does not reach a sufficient level to result in insufficient improvement of capacitance. On the other hand, if the sub-surface layer contains a total average concentration of more than 0.1 wt % of these elements, then an excess number of pits is formed resulting in the coalescing of pits, thereby reducing the surface area and thus, capacitance. To obtain a stable and excellent capacitance, the total concentration should be in a range from 0.0024 to 0.1 wt %.

Within the inner layers, deeper than 0.2 $\mu$m below the surface, Pb, Bi, or In is allowed to be segregated. For example, within a sub-surface layer ranging from 0.2 to 0.3 $\mu$m below the surface, Pb, Bi, or In sometimes exceeds 0.0001 wt % and even higher than 0.001 wt %. Nevertheless, it is allowable if each of Pb, Bi, and In gives an average concentration of less than 0.0001 wt % in the inner part deeper than 0.2 $\mu$m below surface. When the average concentration in the inner part is equal to or higher than 0.0001 wt %, etching enhances pit generation and induces the crimping of tunnel pits, which then reduces the strength of aluminum foil after etching, increases the amount of melt dissolving loss, and further decreases capacitance.

Although there are not strict limits for the amount of Pb, Bi, and In existing in the surface layer having a depth of 0.1 $\mu$m below the foil surface, the amount of Pb, Bi, and In in the surface layer is preferably equal to or more than the amount existing in the sub-surface layer, having a depth range from 0.1 to 0.2 $\mu$m.

If average aluminum purity is less than 99.90 wt %, normal etching cannot be achieved.

The simplest commercial method to produce an aluminum foil segregating Pb, Bi, and In to a specified layer is one where the annealing conditions (annealing temperature and annealing period) are adjusted by employing a phenomenon in which such elements diffuse from inner layers to the surface layer of aluminum foil and concentrate in the surface layer during the final annealing stage.

The content of Pb, Bi, and In in the sub-surface layer having a depth of 0.1 to 0.2 $\mu$m below the surface is determined by the following procedure.

An aluminum foil having a predetermined surface area is dipped into a 0.5% caustic soda solution at 50° C., and the relation between dipping time and dissolved amount (weight loss) of aluminum foil is measured. From the obtained relation, the precise time required to dissolve the foil from the surface to the depth of 0.1 $\mu$m is determined.

Using the same temperature and concentration of caustic soda solution as before, an aluminum foil having a known surface area is dipped for the period calculated to dissolve the foil to a depth of 0.1 $\mu$m. The surface-dissolved aluminum foil is used as the sample. The sample is again dipped into the caustic soda solution at the same temperature and concentration as before to dissolve the next 0.1 $\mu$m thickness of the sample. The concentration of Pb, Bi, and In in the solution is determined by the atomic absorption method. Finally, the aluminum foil which was dissolved to 0.2 $\mu$m from the surface is completely dissolved into a caustic soda solution, hydrochloric acid, or nitric acid to determine the Pb, Bi, and In content of the inner part of the foil by the atomic absorption method.

As described above, this invention provides an aluminum foil for electrolytic capacitors in which etch pits develop and continue beyond the surface layer into the inner part of the foil.

DETAILED DESCRIPTION OF THE PREFERRED EMBODIMENT

This invention is explained in further detail below referring to examples and comparative examples.

EXAMPLES

Aluminum foil samples having 100 $\mu$m of total thickness and having a content of Pb, Bi, and In in the subsurface layer, which has a depth ranging from 0.1 to 0.2 $\mu$m below the surface, different from the content of such elements in the other parts of the foil were prepared under various final annealing conditions. These samples were electrolytically etched by electrolyzing for 2 min. in a mixed solution of hydrochloric acid (150 ml/l) and sulfuric acid (120 ml/l) at 90° C. and 200 mA/cm$^2$ current density, followed by standing in the mixed solution for 8 min.

Each of the etched aluminum foil samples was cut in 10 mm wide strips, which were then subjected to a repetitive bending test at a bending radius of 0.5 mm under 200 g of tensile load. After the test, each strip was formed to 375 V in an ammonium borate solution, then tested for capacitance.

Table 1 summarizes the etching test results including capacitance and flexural performance in relation to the content of Pb, Bi, and In in the surface layer.

As shown in Table 1, the aluminum foil of this invention possesses excellent capacitance higher than 7.0 microF/cm$^2$ and superior flexural performance.

The analysis of Pb, Bi, and In was carried out using the following procedure.

An aluminum foil sample was dipped in a nitric acid solution bath until the weight loss reached an equivalent figure to the loss of 0.1 $\mu$m of thickness on one side. Then the foil was again dipped in a different bath of nitric acid solution until the weight loss reached an equivalent figure to the loss of 0.1 $\mu$m of thickness on one side. The latter solution should contain foil dissolved to a depth ranging from 0.1 to 0.2 $\mu$m from the original surface, so this solution was analyzed to determine the Pb, Bi, and In content.

The undissolved portion of the aluminum foil was then completely dissolved in a different nitric acid bath, and the solution was analyzed to determine the Pb, Bi, and In content of the layers deeper than 0.2 $\mu$m from the original surface.

TABLE 1

| Example | Average value in the layer between 0.1 to 0.2 $\mu$m below the surface | | | | Average value in the layers deeper than 0.2 $\mu$m below the surface | | | Etching test | | Al wt % |
|---|---|---|---|---|---|---|---|---|---|---|
| | pb wt % | Bi wt % | In wt % | Total wt % | pb wt % | Bi wt % | In wt % | Capacitance $\mu$F/cm$^2$ | Bending test (cycle) | |
| Ex. No. 1 | 0.002 | 0.0002 | 0.0002 | 0.0024 | <0.00005 | <0.00005 | <0.00005 | 8.1 | 18 | 99.99 |
| Ex. No. 2 | 0.043 | 0.0002 | 0.0002 | 0.0434 | 0.00006 | <0.00005 | <0.00005 | 8.2 | 21 | 99.98 |
| Ex. No. 3 | 0.091 | 0.0002 | 0.0002 | 0.0914 | 0.00008 | <0.00005 | <0.00005 | 7.8 | 24 | 99.97 |
| Ex. No. 4 | 0.005 | 0.005 | 0.0002 | 0.0102 | <0.00005 | 0.00005 | <0.00005 | 7.7 | 20 | 99.98 |
| Ex. No. 5 | 0.0006 | 0.0002 | 0.051 | 0.0518 | <0.00005 | <0.00005 | 0.00007 | 8.6 | 20 | 99.99 |
| Ex. No. 6 | 0.033 | 0.031 | 0.029 | 0.093 | 0.00005 | 0.00005 | 0.00005 | 7.5 | 22 | 99.96 |
| Comparative Ex. No. 1 | 0.0006 | 0.0002 | 0.0001 | 0.0009 | <0.00005 | <0.00005 | <0.00005 | 5.9 | 23 | 99.99 |
| Comparative Ex. No. 2 | 0.0002 | 0.0002 | 0.0001 | 0.0005 | <0.00005 | <0.00005 | <0.00005 | 4.4 | 21 | 99.99 |
| Comparative Ex. No. 3 | 0.091 | 0.005 | 0.022 | 0.118 | 0.00008 | 0.00005 | 0.00006 | 6.0 | 18 | 99.98 |
| Comparative Ex. No. 4 | 0.040 | 0.004 | 0.031 | 0.075 | 0.00008 | 0.00005 | 0.0004 | 7.0 | 9 | 99.97 |
| Comparative Ex. No. 5 | 0.130 | 0.0002 | 0.0002 | 0.1304 | 0.00009 | <0.00005 | <0.00005 | 4.6 | 20 | 99.99 |
| Comparative Ex. No. 6 | 0.090 | 0.0002 | 0.0002 | 0.0904 | 0.00008 | <0.00005 | <0.00005 | Surface was totally dissolved and no normal pit was formed | | 99.89 |

What is claimed is:

1. An aluminum foil for electrolytic capacitors, wherein the subsurface layer having a depth of 0.1 to 0.2 $\mu$m below the surface thereof contains at least one element selected from the group consisting of Pb, Bi, and In at a total average concentration ranging from 0.001 to 0.1 wt %, and wherein the inner part below the subsurface layer contains less than 0.0001 wt % average concentration for each of Pb, Bi, and In, and wherein the average aluminum purity throughout all layers from the surface to the inner part is not less than 99.90 wt %.

2. An aluminum foil for electrolytic capacitors of claim 1, wherein the sub-surface layer having a depth of 0.1 to 0.2 $\mu$m below the surface of the aluminum foil contains at least one element selected from the group consisting of Pb, Bi, and In at total average concentration ranging from 0.0024 to 0.1 wt %.

3. An aluminum foil for electrolytic capacitors of claim 1, wherein the surface layer having a depth of 0.1 $\mu$m from the surface of the aluminum foil contains Pb, Bi, and In at a quantity not less than the quantity of Pb, Bi, and In in the sub-surface layer having a depth of 0.1 to 0.2 $\mu$m below the surface of the aluminum foil.

* * * * *